United States Patent
Kang et al.

(10) Patent No.: US 7,953,199 B2
(45) Date of Patent: May 31, 2011

(54) SYNCHRONIZATION ERROR TRACKING DEVICE AND METHOD THEREOF

(75) Inventors: Kyu-Min Kang, Daejeon (KR); Sang In Cho, Daejeon (KR); Sung Woo Choi, Daejeon (KR); Sangsung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/610,604

(22) Filed: Nov. 2, 2009

(65) Prior Publication Data

US 2010/0142596 A1 Jun. 10, 2010

(30) Foreign Application Priority Data

Dec. 8, 2008 (KR) .................. 10-2008-0124202

(51) Int. Cl.
*H04L 7/00* (2006.01)
*H04L 25/00* (2006.01)
*H04L 25/40* (2006.01)
(52) U.S. Cl. ........ 375/371; 375/130; 375/142; 375/150; 375/343; 375/354; 375/365; 375/366; 375/367; 375/368
(58) Field of Classification Search .................. 375/130, 375/142, 150, 343, 354, 365–368, 371
See application file for complete search history.

(56) References Cited

U.S. PATENT DOCUMENTS

| 6,356,542 | B1 | 3/2002 | Hayata | |
|---|---|---|---|---|
| 2003/0186714 | A1* | 10/2003 | Vihriala | 455/506 |
| 2006/0083269 | A1* | 4/2006 | Kang et al. | 370/509 |

FOREIGN PATENT DOCUMENTS

| KR | 10-2006-0032889 A | 4/2006 |
|---|---|---|
| KR | 10-2006-0034582 A | 4/2006 |
| KR | 10-2006-0070613 A | 6/2006 |

OTHER PUBLICATIONS

Kyu-Min Kang & Sang-Sung Choi, "Initial Timing Acquistion for Binary Phase-Shift Keying Direct Sequence Ultra-wideband Transmission", ETRI Journal, vol. 30, No. 4, pp. 495-505, Aug. 2008.

* cited by examiner

*Primary Examiner* — Curtis B Odom
(74) *Attorney, Agent, or Firm* — Kile Park Goekjian Reed & McManus PLLC (57) ABSTRACT

Provided is a synchronization error tracking device and method. The method and system estimates and corrects the synchronization error generated by time and frequency offsets during the data transmission interval and uses a module designed for initial synchronization or channel estimation without adding a new correlation operator. Further, a combining mark value and a synchronization position value acquired during the synchronization process are used.

11 Claims, 6 Drawing Sheets

SYNCHRONIZATION ERROR TRACKING DEVICE AND METHOD THEREOF

CROSS-REFERENCE TO RELATED APPLICATION

This application claims priority to and the benefit of Korean Patent Application No. 10-2008-0124202 filed in the Korean Intellectual Property Office on Dec. 8, 2008, the entire contents of which are incorporated herein by reference.

BACKGROUND OF THE INVENTION (a) Field of the Invention

The present invention relates to a synchronization error tracking device and method.

(b) Description of the Related Art

Since the direct sequence ultra wideband (DS-UWB) system transmits signals by using an ultra-wideband frequency, the signals generate great synchronization errors because of multipath fading caused by multipaths of a transmission channel in the case of transmitting signals, timing offsets generated between system clock signals used by the baseband of a transmitter/receiver, and frequency offsets generated by a mismatch of a local oscillator used for a radio frequency (RF) transceiver. Since performance of a UWB system receiver is deteriorated by inter-symbol interference (ISI) when the timing offsets and the frequency offsets are generated, it is required to continuously track and compensate the synchronization error in the payload transmission interval as well as the preamble transmission interval. Many methods for compensating the synchronization error have been known, but they are inefficient for the DS-UWB system for performing packet data communication by using the ultra-wideband frequency bandwidth. Also, the existing code division multiple access (CDMA) system is complicated because it uses individual modules so as to compensate the frequency offsets and control packet synchronization and symbol synchronization. For example, the industry standard 95 (IS-95) or the wideband CMDA (WCDMA) system uses a method for transmitting a pilot signal from a base station to a mobile station and acquiring initial code synchronization for the purpose of initial synchronization.

However, the UWB system must transmit a preamble sequence other than the pilot signal during communication on a piconet and acquire initial symbol synchronization and frame synchronization. Also, it has a problem of additionally compensating the synchronization error caused by the frequency offsets occurring between the clock signals used by the transmitter/receiver. Further, an initial synchronization acquisition method for using a searcher block to simultaneously acquire initial symbol synchronization and frame synchronization and additionally compensate the synchronization error caused by the frequency offset has been proposed. However, the conventional initial synchronization acquisition method is efficiently applicable to the DS-UWB system designed in the parallel processing structure, but it is only applicable to the preamble transmission interval transmitted to a preamble pattern and hence it is inapplicable to the data transmission interval.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a synchronization tracking device and method for compensating and estimating the synchronization error by using an output value of a correlation detector in the DS-UWB system designed in the parallel processing structure.

An exemplary embodiment of the present invention provides a device for estimating a synchronization error of an input signal transmitted by a transmitter, including: a digital correlation detector for receiving the input signal as a plurality of complex signals, performing a correlation operation process on them, and outputting a plurality of complex correlation operation process values; a power calculator for receiving the plurality of complex correlation operation process values, calculating the power value, and outputting it as a plurality of power values; a power combiner for receiving the plurality of power values and calculating a first energy value, a second energy value, and a third energy value; and a synchronization detector for comparing the three energy values, and determining and detecting a synchronization position of the input signal.

Another embodiment of the present invention provides a method for estimating a synchronization error of an input signal transmitted by a transmitter, including: receiving the input signal as a plurality of complex signals, performing a correlation operation on the input signal with a stored spread code, and outputting a plurality of complex correlation operation process values; calculating a power value based on the plurality of complex correlation operation process values, and calculating an on-time energy value, an early-time energy value, and a late-time energy value by using the calculated power value, a stored synchronization position value, and a combining mark value; and determining and detecting a synchronization position of the input signal based on the on-time energy value, the early-time energy value, and the late-time energy value.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A synchronization tracking method and device according to an exemplary embodiment of the present invention will now be described with reference to accompanying drawings.

Figure 1:
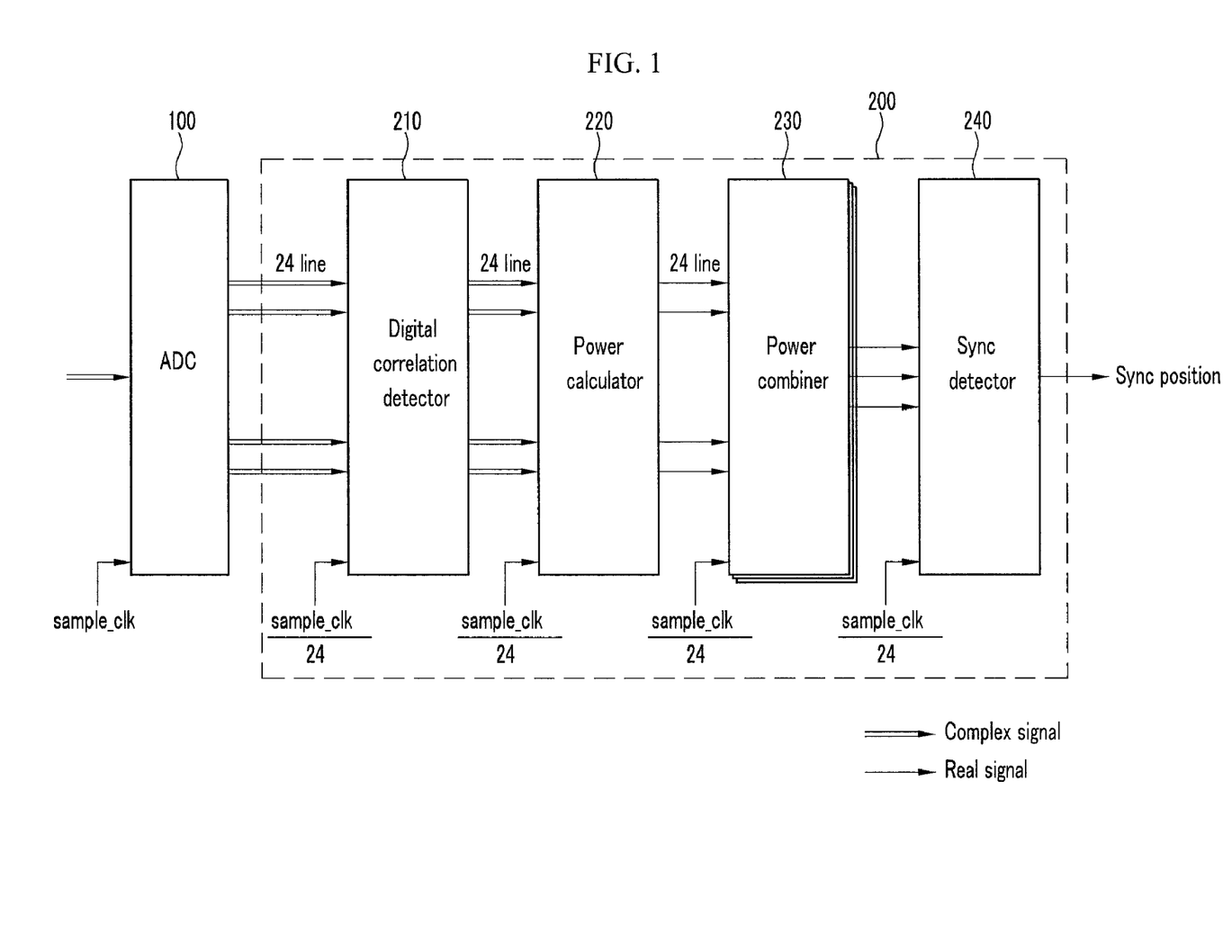
FIG. 1 shows a configuration diagram of a synchronization tracker of a modem receiver according to an exemplary embodiment of the present invention.

FIG. 1 shows a configuration diagram of a synchronization tracker of a modem receiver according to an exemplary embodiment of the present invention.

As shown in FIG. 1, a synchronization tracker 200 of a DS-UWB modem receiver according to an exemplary embodiment of the present invention includes a digital correlation detector 210, a power calculator 220, a power combiner 230, and a synchronization detector 240. Before the synchronization tracker 200, a signal output by a modem transmitter is converted into a baseband signal by an RF processing terminal (not shown) of a modem receiver, and the converted analog signal is transmitted to an analog to digital converter (ADC) 100.

The ADC 100 converts the analog baseband signal into a digital signal, and transmits it to the digital correlation detector 210 of the synchronization tracker 200 in order to perform the converted received input signal parallel process. The digital correlation detector 210 receives 24 complex signals to apply a correlation operation process on the same and outputs 24 result values to the power calculator 220 in order to process the received input signal in parallel. The power calculator 220 calculates 24 power values by using the 24 result values provided by the digital correlation detector 210, and transmits the calculated power values to the power combiner 230. The power combiner 230 calculates three kinds of energy values according to an exemplary embodiment of the present invention, and transmits the energy values to the synchronization detector 240.

The synchronization detector 240 compares the energy values provided by the power combiner 230 to determine whether to maintain the current synchronization position value (Sync_position) or shift the synchronization position forward or backward by one chip. The determined synchronization position value is stored in a register (not shown). In this instance, the ADC 100 is operable by sample clock signals, and the constituent elements in the synchronization tracker 200 are operable by the system clock signals that are 24 times later than the sample clock signals.

The constituent elements in the synchronization tracker 200 will now be described in detail. The digital correlation detector 210 will now be described with reference to FIG. 2.

Figure 2:
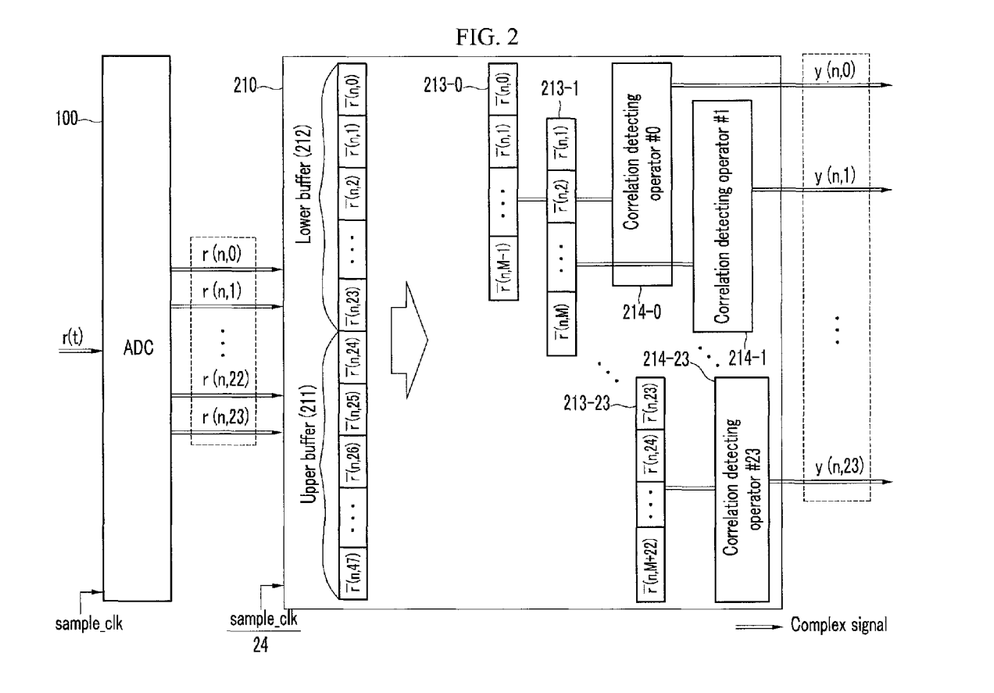
FIG. 2 shows a configuration diagram of a digital correlation detector in the parallel processing structure according to an exemplary embodiment of the present invention.

FIG. 2 shows a configuration diagram of a digital correlation detector in the parallel processing structure according to an exemplary embodiment of the present invention.

As shown in FIG. 2, the digital correlation detector 210 includes buffers 211 and 212 and a plurality of correlation detecting operators. The buffers 211 and 212 include a 24-chip upper buffer 211 and a 24-chip lower buffer 212, and store the 24 complex input values provided by the ADC 100 in the upper buffer 211 and the lower buffer 212 as expressed in Equation 1.

$$\bar{r}(n, k) = \bar{r}(n-1, 24+k), \quad \text{(Equation 1)}$$

$$\bar{r}(n, 24+k) = r(n, k),$$

$$k = 0, 1, \ldots, 23$$

The complex input values stored in the buffers 211 and 212 can be expressed as Equation 2.

$$\bar{r}(n,k) = \bar{r}_I(n,k) + j\bar{r}_Q(n,k) \quad \text{(Equation 2)}$$

Here, $\bar{r}_I(n,k)$ and $\bar{r}_Q(n,k)$ an represent the real part and the imaginary part of the complex input signal. The 24 input buffer values with the length M to be used for the 24 correlation detecting operators 214-0 to 214-23 from among the 48 chip input signals in the upper buffer 211 and the lower buffer 212 are stored in the buffers. The correlation detecting operators 214-0 to 214-23 perform a correlation operation on the 24 input buffer values with the length M and the spread code with the length M, and transmit an operation result value to the power calculator 220.

The correlation detecting operator will now be described with reference to FIG. 3. For better comprehension and ease of description, the exemplary embodiment of the present invention will describe the configuration of the correlation detecting operator 214-$k$ at a random position that is the k-th position.

Figure 3:
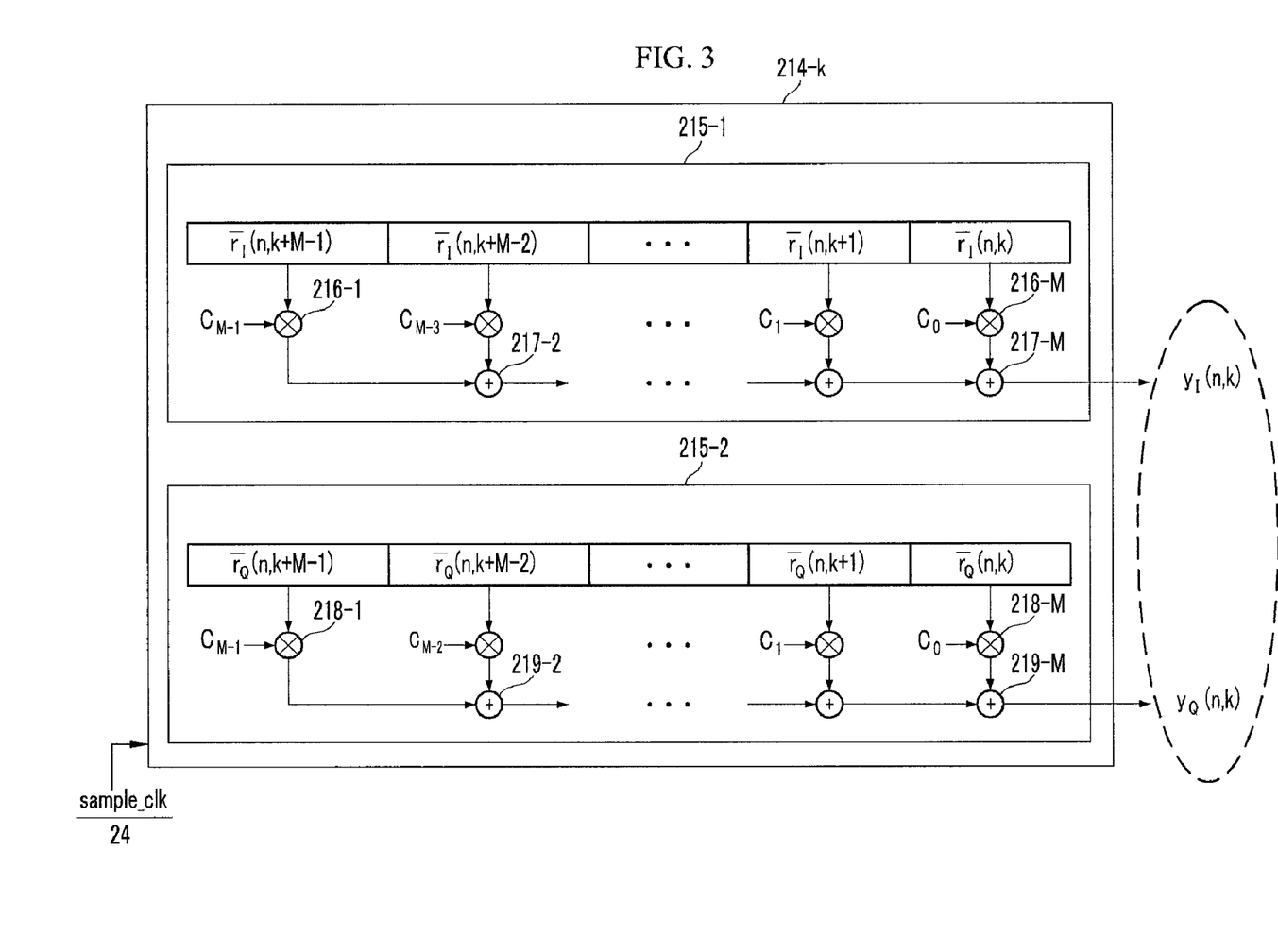
FIG. 3 shows a configuration diagram of a correlation detecting operator according to an exemplary embodiment of the present invention.

FIG. 3 shows a configuration diagram of a correlation detecting operator according to an exemplary embodiment of the present invention.

As shown in FIG. 3, the k-th correlation detecting operator 214-$k$ from among the 24 correlation detecting operators according to the exemplary embodiment of the present invention includes a first correlation detecting module 215-1 and a second correlation detecting module 215-2. In the exemplary embodiment of the present invention, for the example of 24 parallel processes, the correlation detecting modules 215-1 and 215-2 respectively include a plurality of multipliers 216-1 to 216-M and 218-1 to 218-M and a plurality of adders 217-2 to 217-M and 219-2 to 219-M. The multipliers 216-1 to 216-M of the first correlation detecting module 215-1 multiply the real part input buffer value with the length M and the spread code with the length M known by the receiver. Upon receiving the multiplied results by the multipliers 216-1 to 216-M, the adders 217-2 to 217-M add the result values, and acquire the k-th real part correlation operation result value.

In a like manner, the multipliers 218-1 to 218-M of the second correlation detecting module 215-2 multiply the imaginary part input buffer value with the length M and the spread code with the length M, and the adders 219-2 to 219-M add the values multiplied by the multipliers 218-1 to 218-M and acquire the k-th imaginary part correlation operation resulting value. The correlation operation value of the k-th correlation detecting operator 214-$k$ is given as Equation 3.

$$y(n, k) = y_I(n, k) + jy_Q(n, k) \quad \text{(Equation 3)}$$

$$= \sum_{i=0}^{M-1} \bar{r}(n, i+k)c_i,$$

$$k = 0, 1, \ldots, 23.$$

Here, $y_I(n,k)$ and $y_Q(n,k)$ represent the real part and imaginary part correlation operation result values acquired by the k-th correlation detecting operator 214-$k$. The correlation operation resulting value is transmitted to the power calculator 220.

A configuration of the power calculator 220 will now be described with reference to FIG. 4.

Figure 4:
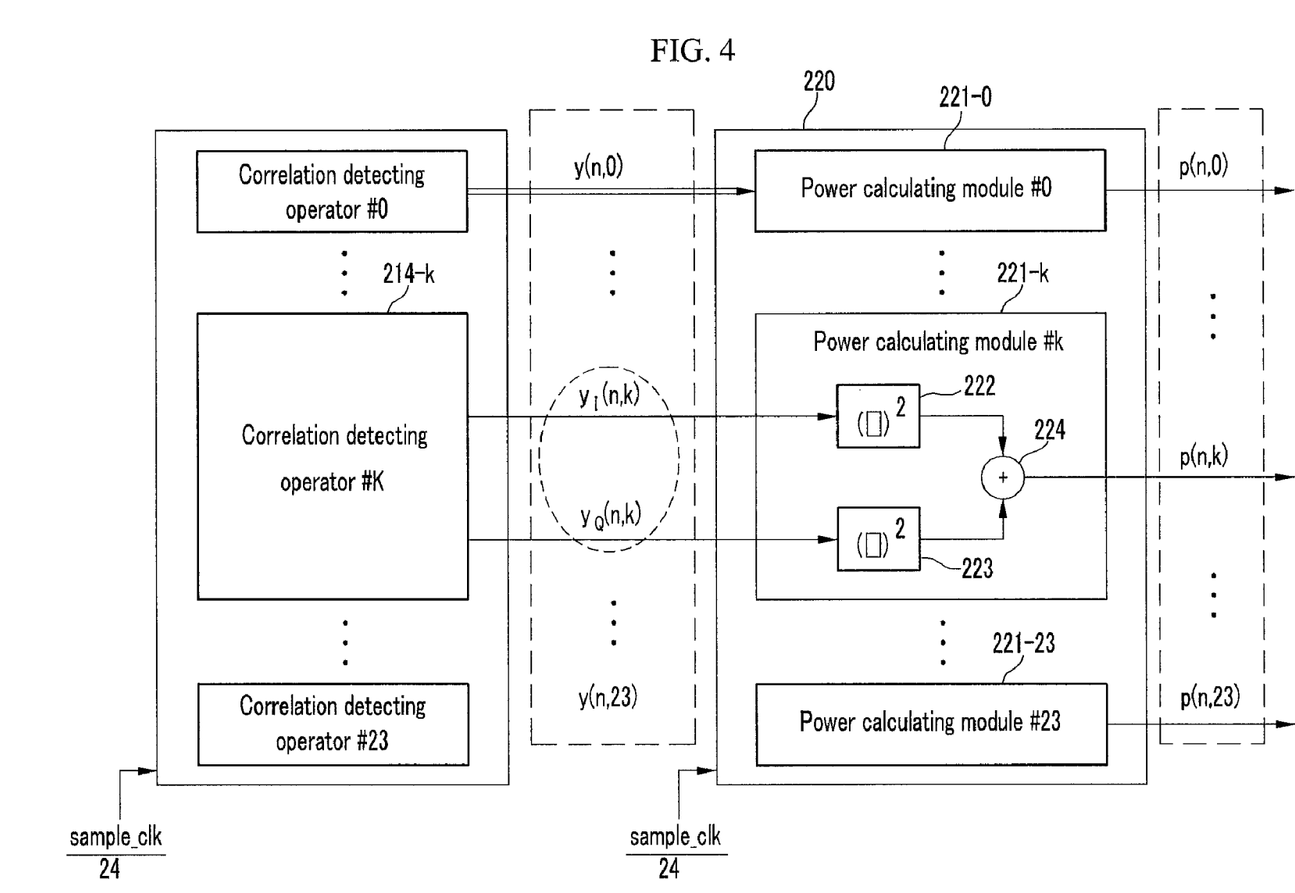
FIG. 4 shows a configuration diagram of a power calculator according to an exemplary embodiment of the present invention.

FIG. 4 shows a configuration diagram of a power calculator according to an exemplary embodiment of the present invention.

As shown in FIG. 4, the power calculator includes 24 power calculating modules 221-0 to 221-23. The correlation operation result value acquired by the k-th correlation detecting operator 214-$k$ in FIG. 3 is input to the k-th power calculating module 221-k. The k-th power calculating module 221-k squares the real part input signal and the imaginary part input signal of the complex correlation operation result value at the square operation modules 222 and 223 respectively, and adds the result signal at the addition module 224 to find the power result value. The other power calculating module configured in a like manner described from the k-th power calculating module 221-k acquires the power result value. The power resulting value acquired by the k-th power calculating module 221-k is expressed in Equation 4.

$$p(n,k)=y_I(n,k)^2+y_Q(n,k)^2, k=0, 1, \ldots, 23 \quad \text{(Equation 4)}$$

The power result value is transmitted to the power combiner 230, and the configuration of the power combiner 230 will now be described with reference to FIG. 5.

Figure 5:
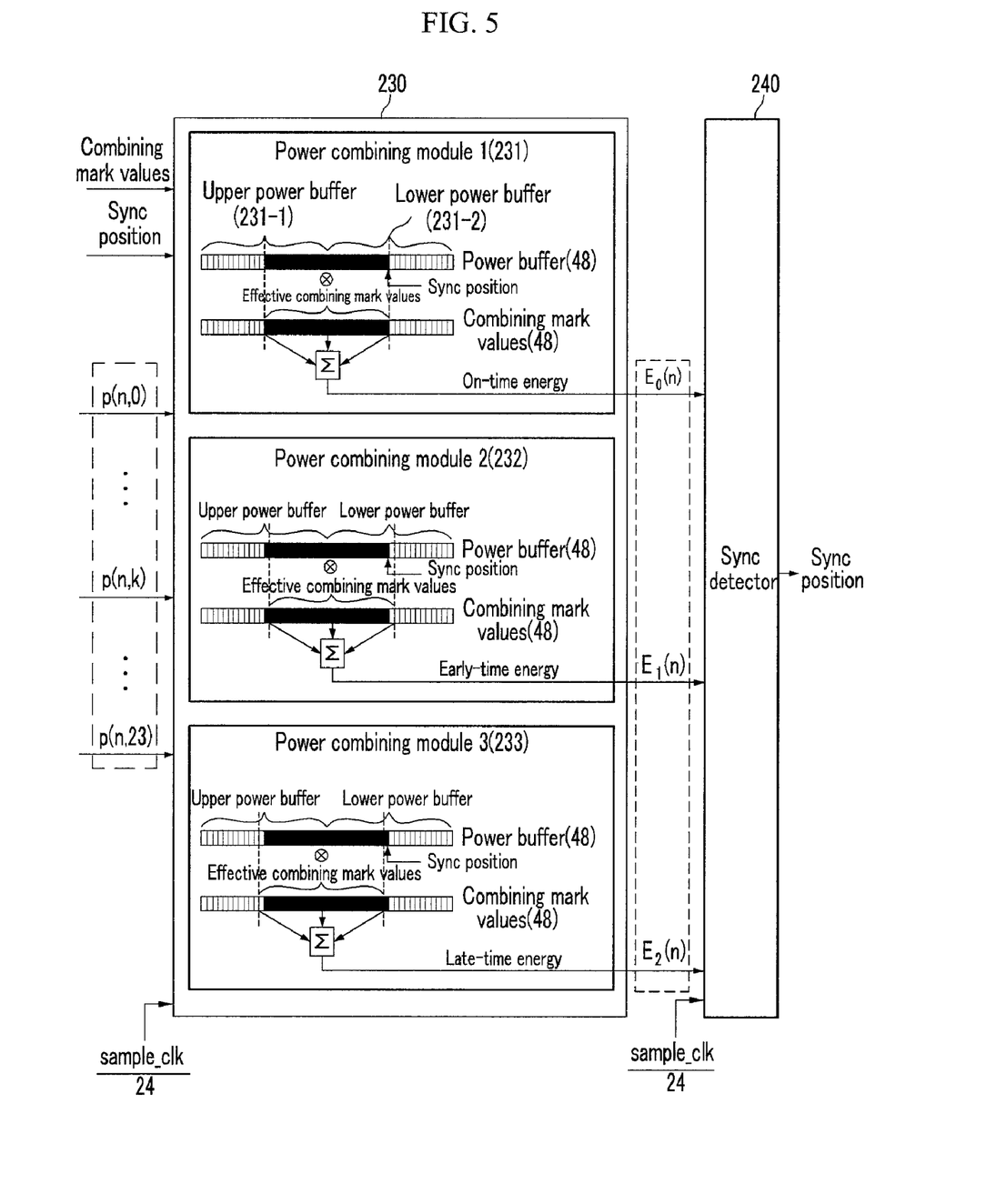
FIG. 5 shows a configuration diagram of a power combiner according to an exemplary embodiment of the present invention.

FIG. 5 shows a configuration diagram of a power combiner according to an exemplary embodiment of the present invention.

As shown in FIG. 5, the power combiner 230 includes a, first power combining module 231, a second power combining module 232, and a third power combining module 233. The first power combining module 231 finds an on-time energy value, the second power combining module 232 finds an early-time energy value, and the third power combining module 233 finds a late-time energy value.

The power combiner 230 according to the exemplary embodiment of the present invention uses a combined mark value and a synchronization position value stored in a register to find the 3 kinds of power values, and uses the 24 power result values transmitted by the power calculator 220 to find the power value. The 24 power result values transmitted by the power calculator 220 are stored in the 48-chip power buffer in the power combiner 230 as expressed in Equation 5. The power buffer includes an upper power buffer 231-1 and a lower power buffer 231-2.

$$\bar{p}(n, k) = \bar{p}(n-1, 24+k), \quad \text{(Equation 5)}$$
$$\bar{p}(n, 24+k) = p(n, k),$$
$$k = 0, 1, \ldots, 23$$

The on-time energy value, the early-time energy value, and the late-time energy value that are found in the n-th symbol transmission interval are expressed as Equation 6 to Equation 8.

$$E_0(n) = \sum_{j=0}^{23} \bar{p}(n, j+\Omega(n))\zeta(n, j+\Omega(n)) \quad \text{(Equation 6)}$$

$$E_1(n) = \sum_{j=0}^{23} \bar{p}(n, j+\Omega(n)-1)\zeta(n, j+\Omega(n)) \quad \text{(Equation 7)}$$

$$E_2(n) = \sum_{j=0}^{23} \bar{p}(n, j+\Omega(n)+1)\zeta(n, j+\Omega(n)) \quad \text{(Equation 8)}$$

Here, $\Omega(n)$, $(0 \leq \Omega(n) \leq 23)$ indicates a synchronization position value stored in the register during the n-th symbol transmission interval, and $\zeta(n,k)$ represents a combining mark value corresponding to the n-th symbol k-th sample position.

For example, in the case of calculating the on-time energy value $E_0(n)$, 24 effective combining mark values starting at the synchronization position value from among 48 combining mark values are referred to, and when the value is 1, the corresponding power result value is included in the case of calculating the energy value. When the value is 0, the corresponding power result value is not included therein. The early-time energy value $E_1(n)$ and the late-time energy value $E_2(n)$ are calculated in a like manner of the on-time energy value. The method for finding the 48 combining mark values and synchronization position values in the initial synchronization process is well known and it will not be described in the exemplary embodiment of the present invention.

The on-time energy value, the early-time energy value, and the late-time energy value that are found as Equation 6 to Equation 8 are transmitted to the synchronization detector 240. The synchronization detector 240 compares the early-time energy value and the on-time energy value. When the early-time energy value is greater than the on-time energy value, the synchronization position value is reduced by 1. However, when the early-time energy value is less than the on-time energy value, the late-time energy value is compared with the on-time energy value. When the late-time energy value is greater than the on-time energy value, the synchronization position value is increased by 1. In not, the synchronization position value is not changed. The detected synchronization position value is stored in the register, and it is continuously used during the next symbol transmission interval.

A method for tracking a synchronization position will now be described based on the synchronization tracker for parallel processing with reference to FIG. 6.

Figure 6:
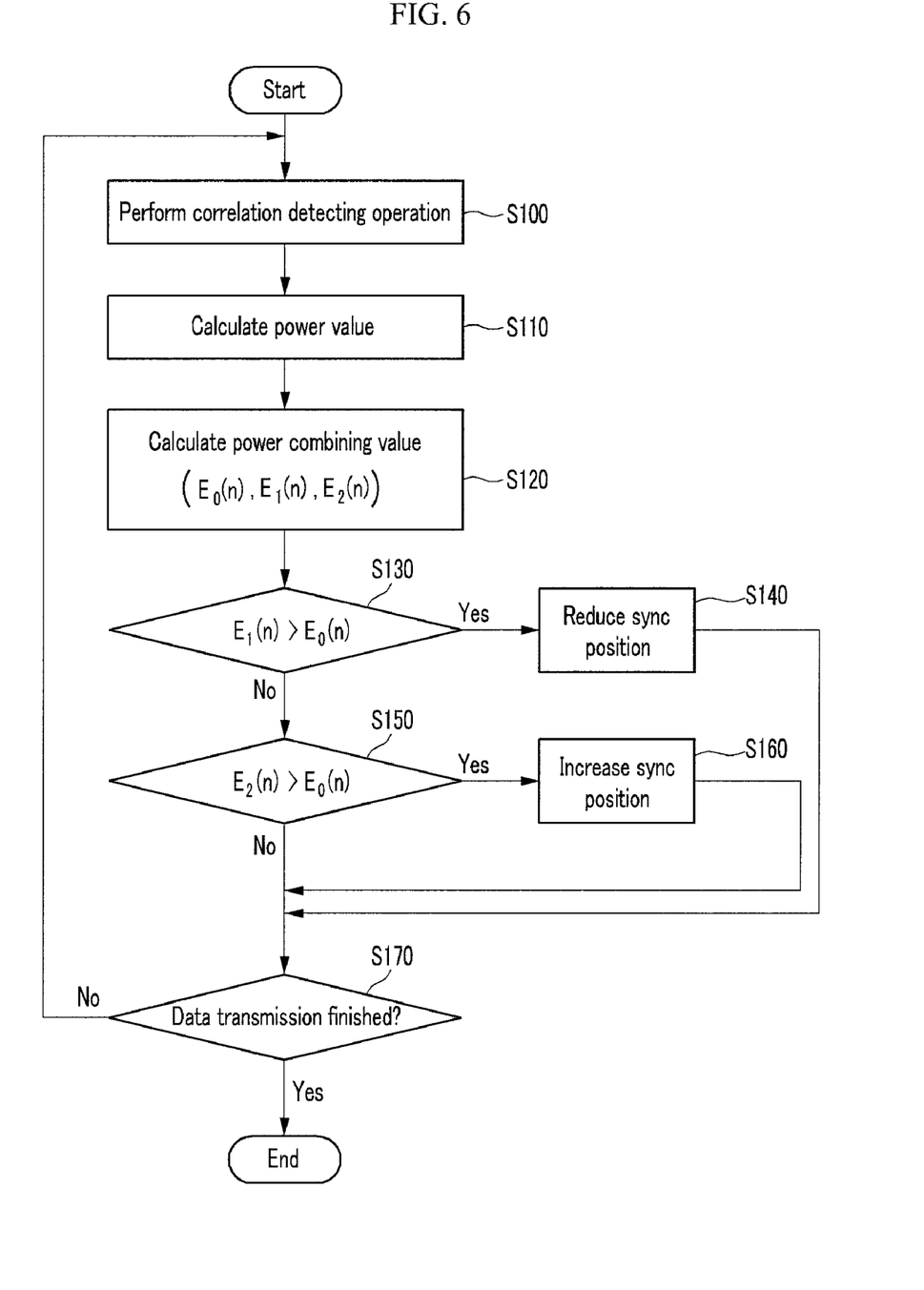
FIG. 6 shows a flowchart of a synchronization position tracking method that is appropriate for a DS-UWB system in the parallel processing structure according to an exemplary embodiment of the present invention.

FIG. 6 shows a flowchart of a synchronization position tracking method appropriate for a DS-UWB system in the parallel processing structure according to an exemplary embodiment of the present invention.

As shown in FIG. 6, in order to parallel process the received input signal converted into the digital signal through the ADC 100, the digital correlation detector 210 receives 24 signals to apply a correlation operation process to the signals (S100), and transmits 24 correlation operation result values to the power calculator 220. The power calculator 220 calculates 24 power values from the input correlation operation result values (S110), and transmits 24 power values to the power combiner 230. The power combiner 230 calculates the on-time energy value, the early-time energy value, and the late-time energy value by using the 24 power values provided by the power calculator 220 and the combining mark value and synchronization position value stored in the register (S120). The on-time energy value, the early-time energy value, and the late-time energy value calculated by the power combiner 230 are transmitted to the synchronization detector 240.

The synchronization detector 240 compares the on-time energy value and the early-time energy value (S130). When the early-time energy value is greater than the on-time energy value, the synchronization detector 240 reduces the synchronization position value by 1 (S140), and if not, it compares the late-time energy value and the on-time energy value (S150). When the late-time energy value is greater than the on-time energy value, the synchronization detector 240 increases the synchronization position value by 1 (S160), and if not, it transmits data without changing the synchronization position value.

The synchronization detector 240 checks whether data transmission is finished after a predetermined time has passed or after a predetermined time frame (S170), and it terminates the synchronization position tracking algorithm when the data transmission is finished. However, when the data transmission is not terminated, the process after S100 is repeated.

According to the embodiments of the present invention, performance of a receiver of the DS-UWB system in the parallel processing structure is improved since the synchronization error generated by the time and frequency offsets is estimated and corrected in the data transmission interval. Also, system complexity is reduced since a module designed for initial synchronization or channel estimation is shared without adding a new correlation operator. In addition, stability of system performance is maintained since a combining mark value and a synchronization position value acquired in the initial synchronization are used.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for estimating a synchronization error of an input signal transmitted by a transmitter, comprising:
   a digital correlation detector for receiving the input signal as a plurality of complex signals, performing a correlation operation process on them, and outputting a plurality of complex correlation operation process values;
   a power calculator for receiving the plurality of complex correlation operation process values, calculating the power value, and outputting it as a plurality of power values;
   a power combiner for receiving the plurality of power values and calculating a first energy value, a second energy value, and a third energy value by using the received plurality of power values, a stored combining mark value and a synchronization position value; and
   a synchronization detector for comparing the three energy values, and determining and detecting a synchronization position of the input signal.

2. The device of claim 1, wherein
   the digital correlation detector includes:
   a buffer for receiving the plurality of complex signals and storing the same; and
   a correlation detecting operator for receiving the plurality of complex signals stored in the buffer, and performing a correlation operation on them with a stored spread code.

3. The device of claim 2, wherein
   the correlation detecting operator includes:
   a first correlation detecting operation module for performing a correlation operation on the real part signal of the plurality of complex signals and the spread code; and
   a second correlation detecting operation module for performing a correlation operation on the imaginary part signal of the plurality of complex signals and the spread code.

4. The device of claim 1, wherein
   the power calculator includes:
   a square operation module for respectively squaring the real part value and the imaginary part value of the input complex correlation operation process value; and
   an addition module for adding the squared real part value and the squared imaginary part value and outputting it as a power calculation value.

5. The device of claim 1, wherein
   the power combiner includes:
   a first power combining module for calculating a first energy value by using the power calculation value and a stored combining mark value and a synchronization position value;
   a second power combining module for calculating a second energy value by using the power calculation value and a stored combining mark value and a synchronization position value; and
   a third power combining module for calculating a third energy value by using the power calculation value and a stored combining mark value and a synchronization position value.

6. The device of claim 1, wherein
   the first energy value is a on-time energy value, the second energy value is an early-time energy value, and the third energy value is a late-time energy value.

7. A method for estimating a synchronization error of an input signal transmitted by a transmitter, comprising:
   receiving the input signal as a plurality of complex signals, performing a correlation operation on the input signal with a stored spread code, and outputting a plurality of complex correlation operation process values;
   calculating a power value based on the plurality of complex correlation operation process values, and calculating an on-time energy value, an early-time energy value, and a late-time energy value by using the calculated power value, a stored synchronization position value, and a combining mark value; and
   determining and detecting a synchronization position of the input signal based on the on-time energy value, the early-time energy value, and the late-time energy value.

8. The method of claim 7, wherein
   the determining and detecting of the synchronization position includes:
   comparing the on-time energy value and the early-time energy value;
   comparing the on-time energy value and the late-time energy value when the on-time energy value is greater than the early-time energy value; and
   determining the stored synchronization position value to be the synchronization position when the on-time energy value is greater than the late-time energy value.

9. The method of claim 8, wherein the method includes, when the on-time energy value is less than the early-time energy value,
   determining the synchronization position so that the stored synchronization position value is reduced by 1.

10. The method of claim 8, wherein the method includes, when the on-time energy value is less than the late-time energy value,
    determining the synchronization position so that the stored synchronization position value is increased by 1.

11. The method of claim 7, wherein
    the stored synchronization position value and the combining mark value are acquired in the initial synchronization process.

* * * * *